(12) United States Patent
Choi et al.

(10) Patent No.: US 11,175,786 B2
(45) Date of Patent: Nov. 16, 2021

(54) TOUCH SENSOR AND IMAGE DISPLAY DEVICE INCLUDING THE SAME

(71) Applicant: DONGWOO FINE-CHEM CO., LTD., Jeollabuk-do (KR)

(72) Inventors: Byung Jin Choi, Gyeonggi-do (KR); Dong Pil Park, Incheon (KR); Ju In Yoon, Gyeonggi-do (KR); Jae Hyun Lee, Gyeonggi-do (KR)

(73) Assignee: DONGWOOD FINE-CHEM CO., LTD, Jeollabuk-Do (KR)

( * ) Notice: Subject to any disclaimer, the term of this patent is extended or adjusted under 35 U.S.C. 154(b) by 0 days.

(21) Appl. No.: 17/178,421

(22) Filed: Feb. 18, 2021

(65) Prior Publication Data
US 2021/0173528 A1 Jun. 10, 2021

Related U.S. Application Data

(63) Continuation of application No. PCT/KR2019/010736, filed on Aug. 23, 2019.

(30) Foreign Application Priority Data

Aug. 24, 2018 (KR) .................. 10-2018-0099281

(51) Int. Cl.
*G06F 3/044* (2006.01)
*G06F 3/041* (2006.01)
*G06K 9/00* (2006.01)

(52) U.S. Cl.
CPC .......... *G06F 3/0446* (2019.05); *G06F 3/0412* (2013.01); *G06K 9/0002* (2013.01); *G06F 2203/04111* (2013.01)

(58) Field of Classification Search
CPC ......... G06F 3/0448; G06F 2203/04111; G06F 3/0445; G06F 3/0412; G06F 3/0446; G06K 9/0002; G06K 9/00
See application file for complete search history.

(56) References Cited

U.S. PATENT DOCUMENTS

2016/0077622 A1* 3/2016 Lee ..................... G06F 1/1643
                                                          345/173
2018/0068156 A1   3/2018 Hyoungwook et al.

FOREIGN PATENT DOCUMENTS

| KR | 10-2014-0092366 A | 7/2014 |
| KR | 10-2017-0050060 A | 5/2017 |
| KR | 10-2017-0124025 A | 11/2017 |

(Continued)

OTHER PUBLICATIONS

International Search Report for PCT/KR2019/010736 dated Dec. 6, 2019.

*Primary Examiner* — Charles V Hicks
(74) *Attorney, Agent, or Firm* — The PL Law Group, PLLC

(57) ABSTRACT

A touch sensor according to an embodiment of the present invention includes a base layer including a first region and a second region, a touch sensing electrode layer disposed on the first region of the base layer, the touch sensing electrode layer including a plurality of touch sensing unit electrodes having openings formed therein, and a fingerprint sensing electrode layer including a plurality of fingerprint sensing unit electrodes disposed on the second region of the base layer. A space having the same shape as that of the openings is formed between neighboring fingerprint sensing unit electrodes of the plurality of fingerprint sensing unit electrodes.

14 Claims, 5 Drawing Sheets

(56) References Cited

FOREIGN PATENT DOCUMENTS

| KR | 10-2018-0015322 A | 2/2018 |
| KR | 10-2018-0067226 A | 6/2018 |

\* cited by examiner

TOUCH SENSOR AND IMAGE DISPLAY DEVICE INCLUDING THE SAME

CROSS REFERENCE TO RELATED APPLICATIONS AND CLAIM OF PRIORITY

The present application is a continuation application to International Application No. PCT/KR2019/010736 filed on Aug. 23, 2019, which claims priority to the benefit of Korean Patent Application No. 10-2018-0099281 filed in the Korean Intellectual Property Office on Aug. 24, 2018, the entire contents of which are incorporated herein by reference.

BACKGROUND

Technical Field

The present invention relates to a touch sensor and an image display device including the same. More particularly, the present invention relates to a touch sensor including patterned sensing electrodes and an image display device including the same.

Background Art

As information technologies are being developed, various demands in display devices having thinner dimension, light-weight, high efficiency in power consumption, etc., are increasing. The display device may include a flat panel display device such as a liquid crystal display (LCD) device, a plasma display panel (PDP) device, an electro-luminescent display device, an organic light emitting diode (OLED) display device, etc.

A touch panel or a touch sensor capable of inputting a user's direction by selecting an instruction displayed on a screen with a finger or an inputting tool is also developed. The touch panel or the touch sensor may be combined with the display device so that display and information input functions may be implemented in one electronic device. For example, as disclosed in Korean Patent Application Publication No. 2014-0092366, various image display devices combined with a touch screen panel including a touch sensor has been developed recently.

As a resolution of the display device is improved to. e.g., a QHD (Quad High Definition) level, a UHD (Ultra High Definition) level, etc., a high resolution of the touch sensor is also required. Further, as various sensing functions such as a fingerprint sensing are also recently applied to the display device, sensing electrodes of different shapes and sizes may be included in the touch sensor.

In this case, sensing electrodes of a plurality of types and dimensions may be included, and thus electrodes may be visually recognized to a user due to an optical deviation. Accordingly, an image quality of the display device may also be deteriorated. Thus, developments of a method for preventing the visual recognition of the electrodes while implementing a plurality of sensing functions are needed.

SUMMARY

According to an aspect of the present invention, there is provided a touch sensor having improved optical property and sensing capability.

According to an aspect of the present invention, there is provided an image display device including a touch sensor with improved optical property and sensing capability.

1. A touch sensor, including: a base layer including a first region and a second region; a touch sensing electrode layer disposed on the first region of the base layer, the touch sensing electrode layer including a plurality of touch sensing unit electrodes having openings formed therein; and a fingerprint sensing electrode layer including a plurality of fingerprint sensing unit electrodes disposed on the second region of the base layer, wherein a space having the same shape as that of the openings is formed between neighboring fingerprint sensing unit electrodes of the plurality of fingerprint sensing unit electrodes.

2. The touch sensor according to the above 1, wherein the touch sensing electrode layer includes first touch sensing unit electrodes and second touch sensing unit electrodes that are insulated from each other, and the openings include first openings formed in the first touch sensing unit electrodes and second openings formed in the second touch sensing unit electrodes.

3. The touch sensor according to the above 2, wherein the touch sensing electrode layer includes a first touch sensing connector integrally connecting the first touch sensing unit electrodes to each other and a second touch sensing connector integrally connecting the second touch sensing unit electrodes to each other, and the second touch sensing unit electrodes are disposed over the first touch sensing unit electrodes.

4. The touch sensor according to the above 2, wherein the touch sensing electrode layer includes a first touch sensing connector integrally connecting the first touch sensing unit electrodes to each other and a bridge electrode electrically connecting the second touch sensing unit electrodes to each other, and the first touch sensing unit electrodes and the second touch sensing unit electrodes are disposed at the same layer.

5. The touch sensor according to the above 2, wherein the fingerprint sensing electrode layer includes first fingerprint sensing unit electrodes and second fingerprint sensing unit electrodes that are insulated from each other, and wherein the space is defined between a pair of neighboring first fingerprint sensing unit electrodes and a pair of neighboring second fingerprint sensing unit electrodes.

6. The touch sensor according to the above 5, wherein the fingerprint sensing electrode layer incudes a first fingerprint sensing connector integrally connecting the first fingerprint sensing unit electrodes to each other and a second fingerprint sensing connector integrally connecting the second fingerprint sensing unit electrodes to each other, and the second fingerprint sensing unit electrodes are disposed over the first fingerprint sensing unit electrodes.

7. The touch sensor according to the above 5, further including an insulating layer disposed between the first fingerprint sensing unit electrodes and the second fingerprint sensing unit electrodes, wherein the space includes a portion of the insulating layer between the first fingerprint sensing unit electrodes and the second fingerprint sensing unit electrodes in a planar view.

8. The touch sensor according to the above 7, wherein the first touch sensing unit electrodes and the second touch sensing unit electrodes are disposed with the insulating layer interposed therebetween.

9. The touch sensor according to the above 5, wherein the space and the openings have a cross shape.

10. The touch sensor according to the above 1, wherein the space and the openings have the same size.

11. The touch sensor according to the above 1, wherein the fingerprint sensing unit electrodes have a size smaller than that of the touch sensing unit electrodes.

12. A window stack structure, including: a window substrate; and the touch sensor according to embodiments as described above stacked on a surface of the window substrate.

13. The window stack structure according to the above 12, further including a polarizing layer stacked on the surface of the window substrate.

14. An image display device, comprising: a display panel; and the touch sensor according to according to embodiments as described above stacked on the display panel.

In a touch sensor according to embodiments of the present invention, a touch sensing region and a fingerprint sensing region may be included together in a single sensor structure. Accordingly, a plurality of sensing functions by different resolutions may be implemented in one touch sensor.

Sensing electrodes included in the fingerprint sensing region may have a fine pitch and a fine size when compared to those of sensing electrodes included in the touch sensing region to provide a high-resolution sensing. In exemplary embodiments, an opening having the same shape as that of a space defined between the sensing electrodes of the fingerprint sensing region may be included in the sensing electrodes of the touch sensing region.

Accordingly, a pattern similarity in the touch sensing region and the fingerprint sensing region may be enhanced to prevent a visual recognition of the electrodes due to a local pattern deviation. Additionally, transmittance of the touch sensor may be improved through the opening.

DETAILED DESCRIPTION

According to exemplary embodiments of the present invention, there is provided a touch sensor including touch sensing electrodes and fingerprint sensing electrodes and having enhanced pattern similarity to provide improved optical properties. Further, an image display device including the touch sensor is provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
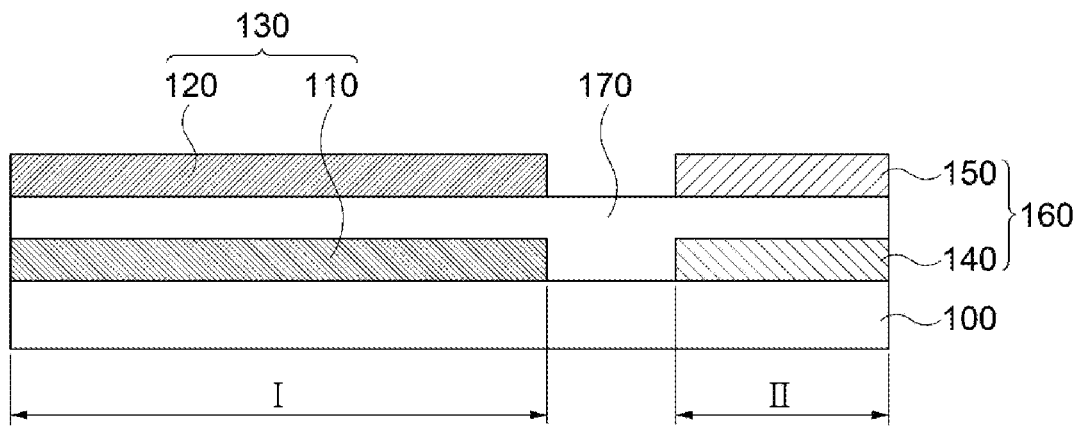
FIG. 1 is a schematic cross-sectional view illustrating a touch sensor in accordance with exemplary embodiments.

FIG. 1 is a schematic cross-sectional view illustrating a touch sensor in accordance with exemplary embodiments.

The term "touch sensor" in the present application is used to encompass sensors that may generate a signal by a touch of a user's finger or a tool, and by a recognition of a shape of a user's fingerprint.

Referring to FIG. 1, the touch sensor may include a touch sensing electrode layer 130 and a fingerprint sensing electrode layer 160 formed on a base layer 100. The touch sensor may include a first region I and a second region II, and the base layer 100 may also be divided into the first region I and the second region II.

In exemplary embodiments, the first region I may serve as a touch sensing region and the second region II may serve as a fingerprint sensing region.

The base layer 100 may include a support layer or a film type substrate for forming the sensing electrode layers 130 and 160. For example, the base layer 100 may include a film material commonly used for a touch sensor without particular limitation, and may include, e.g., glass, a polymer and/or an inorganic insulating material. Examples of the polymer may include cyclic olefin polymer (COP), polyethylene terephthalate (PET), polyacrylate (PAR), polyetherimide (PEI), polyethylene naphthalate (PEN), polyphenylene sulfide (PPS), polyallylate, polyimide (PI), cellulose acetate propionate (CAP), polyethersulfone (PES), cellulose triacetate (TAC), polycarbonate (PC), cyclic olefin copolymer (COC), poly methyl methacrylate (PMMA), etc. Examples of the inorganic insulating material may include silicon oxide, silicon nitride, silicon oxynitride and a metal oxide.

In some embodiments, a layer or film member of an image display device to which the antenna-inserted electrode structure is applied may serve as the base layer 100. For example, an encapsulation layer or a passivation layer included in a display panel may serve as the base layer 100.

The touch sensing electrode layer 130 may be disposed on a portion of the base layer 100 of the first region I. The touch sensing electrode layer 130 may include a first touch sensing electrode layer 110 and a second touch sensing electrode layer 120 with an insulating layer 170 interposed therebetween.

The fingerprint sensing electrode layer 160 may be disposed on a portion of the base layer 100 of the second region II. The fingerprint sensing electrode layer 130 may include a first fingerprint sensing electrode layer 140 and a second fingerprint sensing electrode layer 150 with the insulating layer 170 interposed therebetween.

For example, the first touch sensing electrode layer 110 and the first fingerprint sensing electrode layer 140 may be located at the same layer or at the same level on a top surface of the base layer 100. The insulating layer 170 may be formed on the base layer 100 to cover the first touch sensing electrode layer 110 and the first fingerprint sensing electrode layer 140. The second touch sensing electrode layer 120 and the second fingerprint sensing electrode layer 150 may be located at the same layer or at the same level on a top surface of the insulating layer 170.

The touch sensing electrode layer 130 and the fingerprint sensing electrode layer 160 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), calcium (Ca) or an alloy containing at least one of the metals (e.g., silver-palladium-copper (APC) or copper-calcium (CuCa)). These may be used alone or in combination of two or more.

The touch sensing electrode layer 130 and the fingerprint sensing electrode layer 160 may include a transparent conductive oxide such as indium tin oxide (ITO), indium zinc oxide (IZO), zinc oxide (ZnO), indium zinc tin oxide (IZTO), cadmium tin oxide (CTO), etc.

In some embodiments, the touch sensing electrode layer 130 and the fingerprint sensing electrode layer 160 may include a stacked structure of a transparent conductive oxide and a metal. For example, the touch sensing electrode layer 130 and the fingerprint sensing electrode layer 160 may have a double-layered structure of a transparent conductive oxide layer-metal layer, or a triple-layered structure of a transparent conductive oxide layer-metal layer-transparent conductive oxide layer. In this case, a flexible property may be improved by the metal layer and a signal transmission speed may also be improved by a low resistance of the metal layer while a corrosion resistance and a transparency may be improved by the transparent conductive oxide layer.

The touch sensing electrode layer 130 may include touch sensing unit electrodes, and the fingerprint sensing electrode layer 160 may include a fingerprint sensing unit electrode. In exemplary embodiments, the fingerprint sensing electrode layer 160 may be designed to implement a high-resolution sensing for a recognition a fingerprint shape having a fine pitch. Accordingly, the fingerprint sensing unit electrode may have a pitch and a size smaller than those of the touch sensing unit electrode.

Electrode shapes and structures of the touch sensing electrode layer 130 and the fingerprint sensing electrode layer 160 will be described in more detail later with reference to FIGS. 2 to 4.

The insulating layer 170 may include an inorganic insulating material such as silicon oxide or silicon nitride, or an organic insulating material such as an acrylic resin or a siloxane resin.

In some embodiments, as illustrated in FIG. 1, the first region I and the second region II may be spaced apart or separated from each other.

However, in some embodiments, the second region II may be included in the first region I. For example, a partial region in the first region I may be allocated as the second region II.

Figure 2:
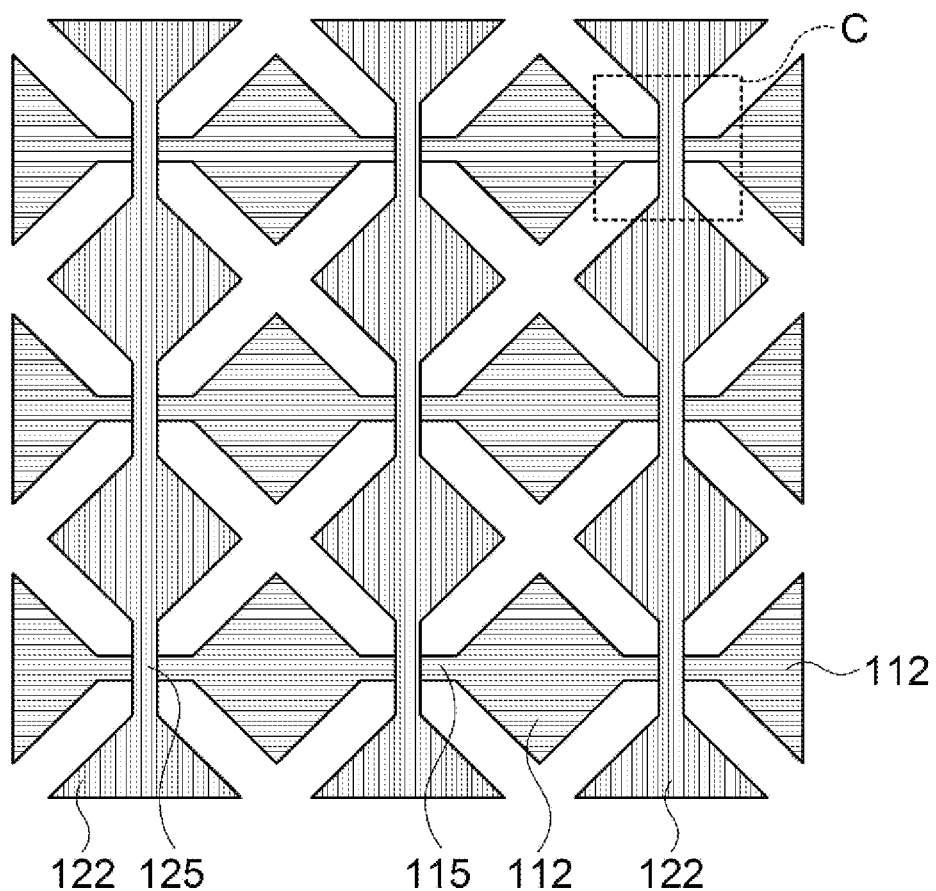
FIG. 2 is a schematic top planar view illustrating an arrangement of sensing electrodes in a first region in accordance with exemplary embodiments.

FIG. 2 is a schematic top planar view illustrating an arrangement of sensing electrodes in a first region in accordance with exemplary embodiments. For example, FIG. 2 illustrates an arrangement of electrode patterns included in the touch sensing electrode layer 130 of FIG. 1.

Referring to FIG. 2, the first touch sensing electrode layer 110 may include first touch sensing unit electrodes 112 and first touch sensing connectors 115. The second touch sensing electrode layer 120 may include second touch sensing unit electrodes 122 and second touch sensing connectors 125.

The first touch sensing unit electrodes 112 and the second touch sensing unit electrodes 122 may be arranged along different directions crossing each other. For example, the first touch sensing unit electrodes 112 may be arranged in a horizontal direction in a plane of FIG. 2, and the neighboring first touch sensing unit electrodes 112 may be integrally connected to each other by the first touch sensing connectors 115 to define a first touch sensing electrode row. A plurality of the first touch sensing electrode rows may be arranged along a vertical direction in the plane of FIG. 2.

The second touch sensing unit electrodes 122 may be arranged along the vertical direction. For example, the second touch sensing unit electrodes 122 adjacent to each other may be integrally connected by the second touch sensing connectors 125 to define a second touch sensing electrode column. A plurality of the second touch sensing electrode columns may be arranged in the horizontal direction in the plane of FIG. 2.

Each of the first and second touch sensing unit electrodes 112 and 122 may have a polygonal shape such as a rhombus shape. However, the shapes of the first and second touch sensing unit electrodes 112 and 122 may be appropriately modified to prevent a visual recognition of electrodes. For example, boundaries of the first and second touch sensing unit electrodes 112 and 122 may have a wavy shape, a sawtooth shape, a shape including a plurality of recesses, or the like.

The first and second touch sensing connectors 115 and 125 may intersect and overlap each other in a planar direction at, e.g., an intersection region C.

Each width of the first and second touch sensing unit electrodes 112 and 122 may be, e.g., in a range from 1 mm to 5 mm, and may be appropriately changed according to a resolution required for a touch sensing.

Figure 3:
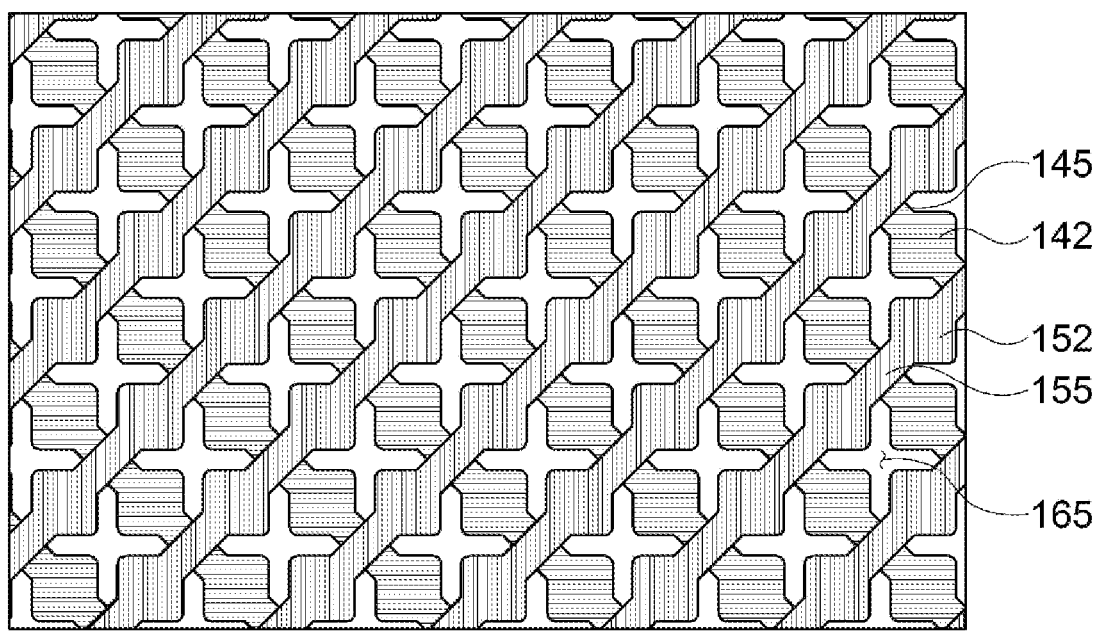
FIG. 3 is a schematic top planar view illustrating an arrangement of sensing electrodes in a second region in accordance with exemplary embodiments.

FIG. 3 is a schematic top planar view illustrating an arrangement of sensing electrodes in a second region in accordance with exemplary embodiments. For example, FIG. 3 illustrates an arrangement of electrode patterns included in the fingerprint sensing electrode layer 160 of FIG. 1.

Referring to FIG. 3, the first fingerprint sensing electrode layer 140 may include first fingerprint sensing unit electrodes 142 and first fingerprint sensing connectors 145. The second fingerprint sensing electrode layer 150 may include second fingerprint sensing unit electrodes 152 and second fingerprint sensing connectors 155.

The first fingerprint sensing unit electrodes 142 and the second fingerprint sensing unit electrodes 152 may be arranged along different directions crossing each other. A plurality of the first fingerprint sensing unit electrodes 142 may be integrally connected to each other by the first fingerprint sensing connectors 145 to define a first fingerprint sensing electrode row. A plurality of the second fingerprint sensing unit electrodes 152 may be integrally connected to each other by the second fingerprint sensing connectors 155 to define a second fingerprint sensing electrode column.

The first fingerprint sensing electrode rows and the second fingerprint sensing electrode columns may extend and may be arranged in directions crossing each other. The first fingerprint sensing connector 145 and the second fingerprint sensing connector 155 may overlap and cross each other in a planar direction.

Each of the first and second fingerprint sensing unit electrodes 142 and 152 may have a polygonal shape such as a rhombus shape. However, the shapes of the first and second fingerprint sensing unit electrodes 142 and 152 may be appropriately modified to prevent a visual recognition of electrodes.

Each width of each of the first and second fingerprint sensing unit electrodes 142 and 152 may be, e.g., in a range from 10 μm to 100 μm, and may be appropriately changed according to a resolution required for a fingerprint sensing.

In exemplary embodiments, as illustrated in FIG. 3, a space 165 may be defined between the first fingerprint sensing unit electrodes 142 and the second fingerprint unit sensing electrodes 152 adjacent to each other in a planar direction. For example, a cross-shaped space 165 may be defined by a pair of first fingerprint sensing unit electrodes 142 and a pair of second fingerprint sensing unit electrodes 152 neighboring each other.

The term space 165 used in the present application may indicate a portion of the insulating layer 170 between the fingerprint sensing unit electrodes 142 and 152.

Figure 4:
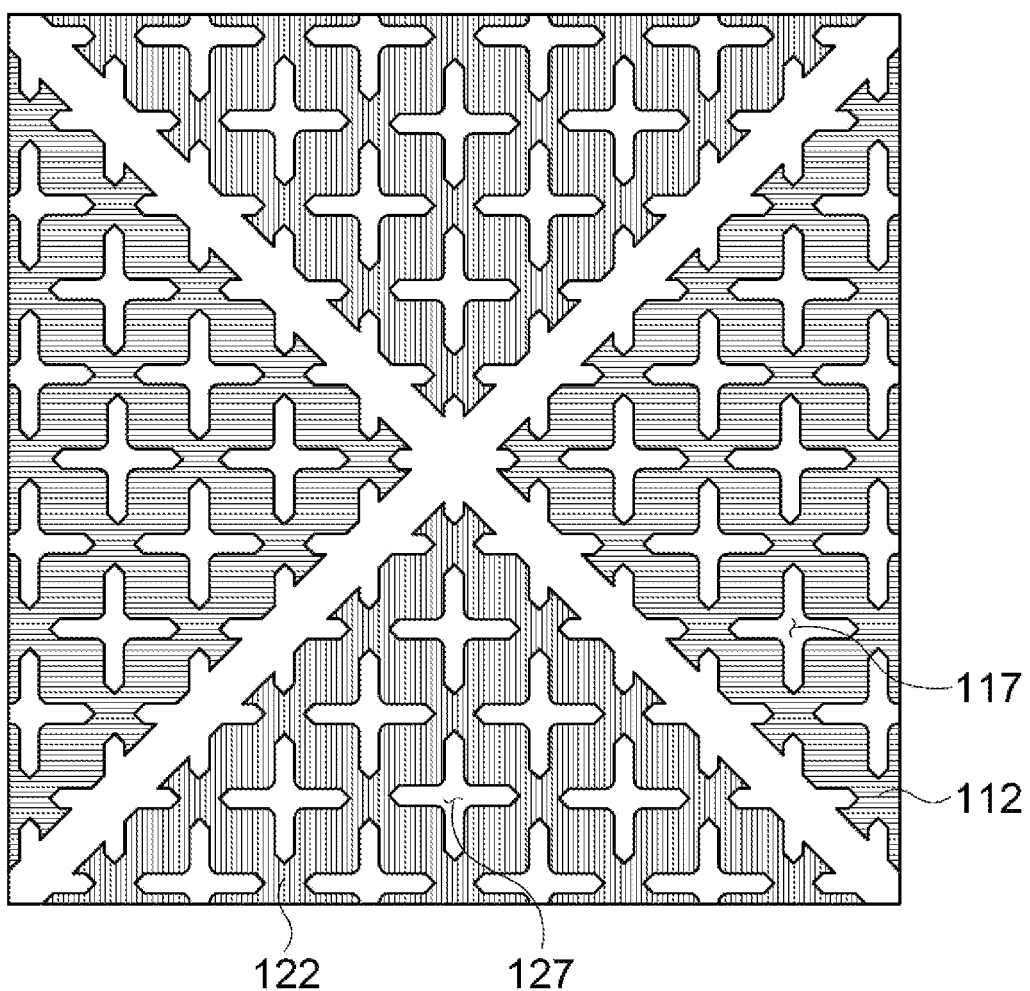
FIG. 4 is a partially enlarged planar view illustrating a shape of a touch sensing electrode in accordance with exemplary embodiments.

FIG. 4 is a partially enlarged planar view illustrating a shape of a touch sensing electrode in accordance with exemplary embodiments. For example, FIG. 4 is an enlarged view of the touch sensing unit electrodes 112 and 122 around the intersection region C of FIG. 2. For convenience of descriptions, the touch sensing connectors 115 and 125 illustrated in FIG. 2 are omitted herein.

Referring to FIG. 4, the first touch sensing unit electrode 112 and the second touch sensing unit electrode 122 may include a first opening 117 and a second opening 127 therein, respectively. For example, the first touch sensing unit electrode 112 may include a plurality of the first openings 117 therein, and the second touch sensing unit electrode 122 may include a plurality of the second openings 127 therein.

In the present application, the openings 117 and 127 may refer to a portion or an area from which the electrode layer is substantially removed.

In exemplary embodiments, the first opening 117 and the second opening 127 may have a shape may have substantially the same shape as that of the space 165 defined between the fingerprint sensing unit electrodes 142 and 152 in the second region II. For example, the first opening 117, the second opening 127 and the space 165 may have substantially the same cross shape.

In some embodiments, the first opening 117 and the second opening 127 may have substantially a cross shape having the same size as that of the space 165.

As described above, the touch sensor according to embodiments of the present invention may include a touch sensing region and a fingerprint sensing region in one sensor structure. Accordingly, a plurality of sensing functions may be implemented in one touch sensor through different resolutions.

Additionally, the openings 117 and 127 having the same shape as that of the space 165 formed in the fingerprint sensing region may be formed in the touch sensing unit electrodes 112 and 122 to increase a pattern similarity in the touch sensing region and the fingerprint sensing region.

Thus, even though sensing electrodes having a fine pitch and a fine size are included in the fingerprint sensing region, the electrode visibility and optical disturbance due to a difference in a pattern shape may be prevented. Further, a transmittance of the touch sensor may be improved through the openings 117 and 127.

Figure 5:
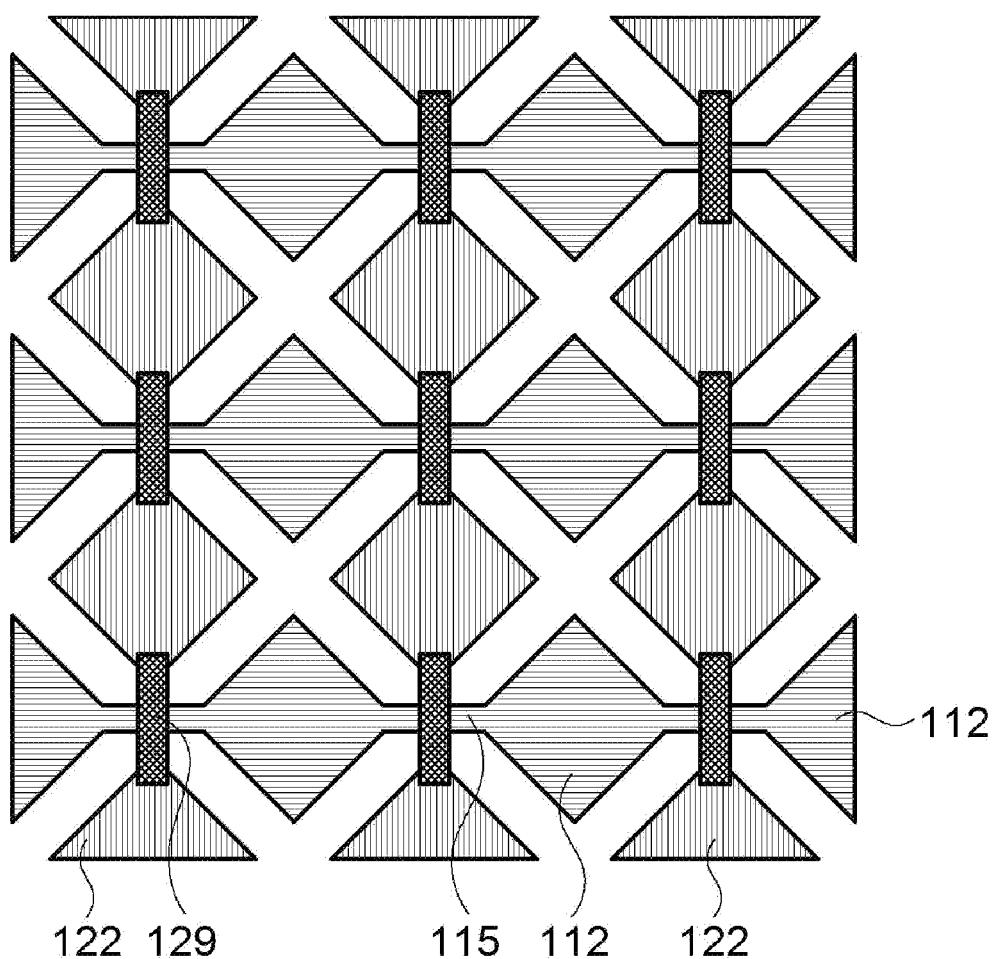
FIG. 5 is a schematic top planar view illustrating an arrangement of sensing electrodes in a first region in accordance with exemplary embodiments.

FIG. 5 is a schematic top planar view illustrating an arrangement of sensing electrodes in a first region in accordance with exemplary embodiments. Detailed descriptions of configurations and structures that are substantially the same as or similar to those described with reference to FIGS. 1 to 4 are omitted.

Referring to FIG. 5, the first touch sensing unit electrodes 112 and the second touch sensing unit electrodes 122 included in the touch sensing electrode layer 130 formed on the first region I may be located at substantially the same layer or the same level. For example, the first touch sensing unit electrodes 112 and the second touch sensing unit electrodes 122 may be arranged on the top surface of the base layer 100 together with the first fingerprint sensing electrode layer 140 of the fingerprint sensing electrode layer 160.

In this case, the first touch sensing unit electrodes 112 may be integrally connected to each other by the first touch sensing connector 115. The second touch sensing unit electrodes 122 neighboring each other may be electrically connected to each other via a bridge electrode 129.

For example, the bridge electrode 129 may be disposed on the insulating layer 170 illustrated in FIG. 1, and may penetrate the insulating layer 170 and contact a pair of the second touch sensing unit electrodes 122 neighboring each other. In this case, the bridge electrodes 129 may be disposed on the insulating layer 170 together with the second fingerprint sensing electrode layer 150.

Figure 6:
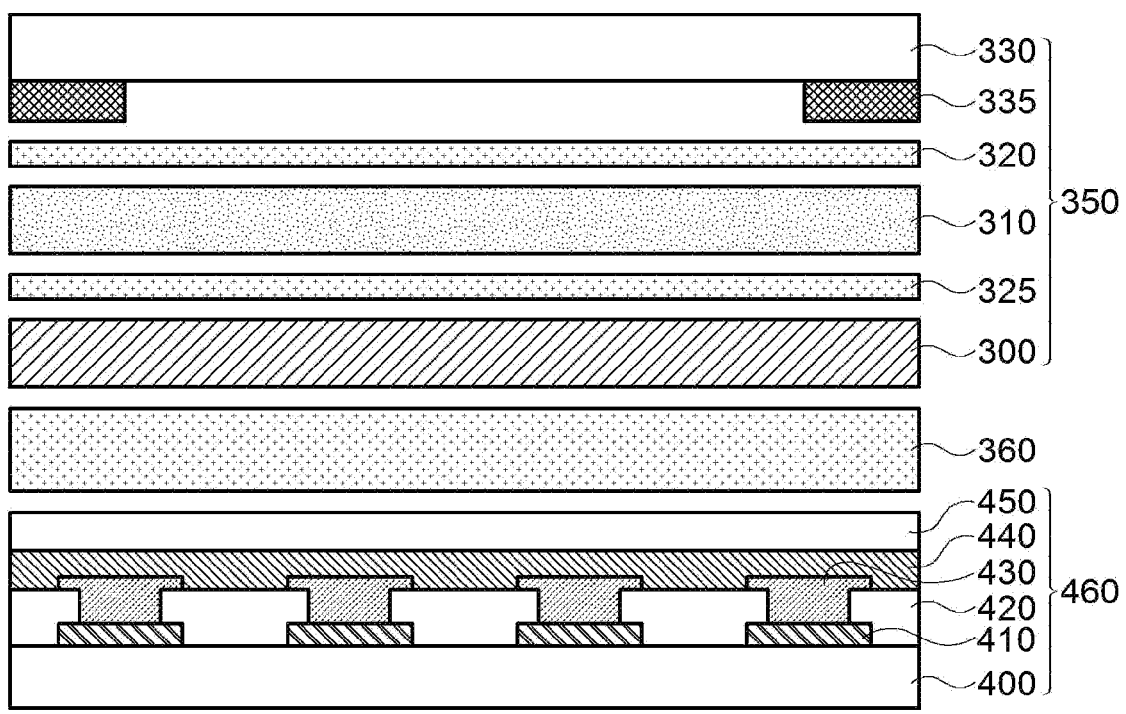
FIG. 6 is a schematic view illustrating a window stack structure and an image display device in accordance with exemplary embodiments.

FIG. 6 is a schematic view illustrating a window stack structure and an image display device in accordance with exemplary embodiments.

Referring to FIG. 6, the window stack structure 350 may include a window substrate 330, a polarizing layer 310 and a touch sensor 300 according to the above-described exemplary embodiments.

The window substrate 330 may include, e.g., a hard coating film. In an embodiment, a light-shielding pattern 335 may be formed on a peripheral portion of one surface of the window substrate 330. The light-shielding pattern 335 may include, e.g., a color-printed pattern, and may have a single-layered or multi-layered structure. A bezel portion or a non-display area of the image display device may be defined by the light-shielding pattern 335.

The polarizing layer 310 may include a coating-type polarizer or a polarizing plate. The coating-type polarizer may include a liquid crystal coating layer that may include a cross-linkable liquid crystal compound and a dichroic dye. In this case, the polarizing layer 310 may include an alignment layer for providing an orientation of the liquid crystal coating layer.

For example, the polarizing plate may include a polyvinyl alcohol-based polarizer and a protective film attached to at least one surface of the polyvinyl alcohol-based polarizer.

The polarizing layer 310 may be directly attached to the surface of the window substrate 330 or may be attached via a first adhesive layer 320.

The touch sensor 300 may be included in the window stack structure 350 as a form of a film or a panel. In an embodiment, the touch sensor 300 may be combined with the polarizing layer 310 via a second adhesive layer 325.

As illustrated in FIG. 6, the window substrate 330, the polarizing layer 310 and the touch sensor 3000 may be sequentially positioned from a viewer's side. In this case, the touch sensing electrode layer and the fingerprint sensing electrode layer of the touch sensor 300 may be disposed under the polarizing layer 310 so that electrodes may be effectively prevented from being seen by the viewer.

If the touch sensor 300 includes a substrate, the substrate may include, e.g., triacetyl cellulose, cycloolefin, cycloolefin copolymer, polynorbornene copolymer, or the like, and, e.g., an in-plane retardation of the substrate may be ±2.5 nm or less.

In an embodiment, the touch sensor 300 may be directly transferred to the window substrate 330 or the polarizing layer 310. In an embodiment, the window substrate 330, the touch sensor 300 and the polarizing layer 310 may be sequentially positioned from the viewer's side.

The image display device may include a display panel 460 and the window stack structure 350 disposed on the display panel 460.

The display panel 460 may include a pixel electrode 410, a pixel defining layer 420, a display layer 430, an opposing electrode 440 and an encapsulation layer 450 disposed on a panel substrate 400.

A pixel circuit including a thin film transistor (TFT) may be formed on the panel substrate 400, and an insulation layer covering the pixel circuit may be formed. The pixel electrode 410 may be electrically connected to, e.g., a drain electrode of the TFT on the insulation layer.

The pixel defining layer 420 may be formed on the insulation layer, and the pixel electrode 410 may be exposed through the pixel defining layer 420 such that a pixel region may be defined. The display layer 430 may be formed on the pixel electrode 410, and the display layer 430 may include, e.g., a liquid crystal layer or an organic light emitting layer.

The opposing electrode 440 may be disposed on the pixel defining layer 420 and the display layer 430. The opposing electrode 440 may serve as, e.g., a common electrode or a cathode of the image display device. The encapsulation layer 450 may be disposed on the opposing electrode 440 to protect the display panel 460.

In some embodiments, the display panel 460 and the window stack structure 350 may be combined with each other through an adhesive layer 360. For example, a thickness of the adhesive layer 360 may be greater than each thickness of the first adhesive layer 320 and the second adhesive layer 325. A viscoelasticity of the adhesive layer 360 may be about 0.2 MPa or less at a temperature ranging from −20° C. to 80° C. In this case, a noise from the display panel 460 may be blocked, and an interface stress while being bent may be alleviated so that damages of the window stack structure 350 may be avoided. In an embodiment, the viscoelasticity of the adhesive layer 360 may be in a range from about 0.01 MPa to about 0.15 MPa.

As a resolution of the image display device increases, a dimension of the pixel region may decrease, and a pitch and a size of sensing electrodes included in the touch sensor 300 may also decrease. Further, while a fingerprint sensor function is included, sensing electrodes having different shapes and dimensions may be included in the touch sensor 300.

However, as described above, the space 165 and the openings 117 and 127 may be utilized to increase the pattern similarity to prevent the visual recognition of electrodes, and improve transmittance and image quality of the image display device.

What is claimed is:

1. A touch sensor, comprising:
    a base layer including a first region and a second region;
    a touch sensing electrode layer disposed on the first region of the base layer, the touch sensing electrode layer comprising a plurality of touch sensing unit electrodes having openings formed therein; and
    a fingerprint sensing electrode layer comprising a plurality of fingerprint sensing unit electrodes disposed on the second region of the base layer, wherein a space having the same shape as that of the openings is formed between neighboring fingerprint sensing unit electrodes of the plurality of fingerprint sensing unit electrodes.

2. The touch sensor according to claim 1, wherein the touch sensing electrode layer comprises first touch sensing unit electrodes and second touch sensing unit electrodes that are insulated from each other, and
    the openings include first openings formed in the first touch sensing unit electrodes and second openings formed in the second touch sensing unit electrodes.

3. The touch sensor according to claim 2, wherein the touch sensing electrode layer comprises a first touch sensing connector integrally connecting the first touch sensing unit electrodes to each other and a second touch sensing connector integrally connecting the second touch sensing unit electrodes to each other, and
    the second touch sensing unit electrodes are disposed over the first touch sensing unit electrodes.

4. The touch sensor according to claim 2, wherein the touch sensing electrode layer comprises a first touch sensing connector integrally connecting the first touch sensing unit electrodes to each other and a bridge electrode electrically connecting the second touch sensing unit electrodes to each other, and
    the first touch sensing unit electrodes and the second touch sensing unit electrodes are disposed at the same layer.

5. The touch sensor according to claim 2, wherein the fingerprint sensing electrode layer comprises first fingerprint sensing unit electrodes and second fingerprint sensing unit electrodes that are insulated from each other, and
    wherein the space is defined between a pair of neighboring first fingerprint sensing unit electrodes and a pair of neighboring second fingerprint sensing unit electrodes.

6. The touch sensor according to claim 5, wherein the fingerprint sensing electrode layer comprises a first fingerprint sensing connector integrally connecting the first fingerprint sensing unit electrodes to each other and a second fingerprint sensing connector integrally connecting the second fingerprint sensing unit electrodes to each other, and
    the second fingerprint sensing unit electrodes are disposed over the first fingerprint sensing unit electrodes.

7. The touch sensor according to claim 5, further comprising an insulating layer disposed between the first fingerprint sensing unit electrodes and the second fingerprint sensing unit electrodes,
    wherein the space includes a portion of the insulating layer between the first fingerprint sensing unit electrodes and the second fingerprint sensing unit electrodes in a planar view.

8. The touch sensor according to claim 7, wherein the first touch sensing unit electrodes and the second touch sensing unit electrodes are disposed with the insulating layer interposed therebetween.

9. The touch sensor according to claim 5, wherein the space and the openings have a cross shape.

10. The touch sensor according to claim 1, wherein the space and the openings have the same size.

11. The touch sensor according to claim 1, wherein the fingerprint sensing unit electrodes have a size smaller than that of the touch sensing unit electrodes.

12. A window stack structure, comprising:
    a window substrate; and
    the touch sensor according to claim 1 stacked on a surface of the window substrate.

13. The window stack structure according to claim 12, further comprising a polarizing layer stacked on the surface of the window substrate.

14. An image display device, comprising:
    a display panel; and
    the touch sensor according to claim 1 stacked on the display panel.

* * * * *